US008265008B2

(12) United States Patent
Zhang et al.

(10) Patent No.: US 8,265,008 B2
(45) Date of Patent: Sep. 11, 2012

(54) TRANSMISSION RESOURCE ASSIGNING METHOD, FEEDBACK METHOD AND PROCESSING METHOD FOR RESPONSE SIGNALS

(75) Inventors: Yuantao Zhang, Beijing (CN); Hua Zhou, Beijing (CN); Jun Tian, Beijing (CN)

(73) Assignee: Fujitsu Limited, Kawasaki (JP)

( * ) Notice: Subject to any disclaimer, the term of this patent is extended or adjusted under 35 U.S.C. 154(b) by 119 days.

(21) Appl. No.: 12/537,903

(22) Filed: Aug. 7, 2009

(65) Prior Publication Data

US 2010/0039926 A1 Feb. 18, 2010

(30) Foreign Application Priority Data

Aug. 15, 2008 (CN) .......................... 2008 1 0147511

(51) Int. Cl.
*H04K 1/10* (2006.01)
(52) U.S. Cl. ........................................ 370/328; 370/208
(58) Field of Classification Search .................. 370/350, 370/328, 522; 455/522; 714/748
See application file for complete search history.

(56) References Cited

U.S. PATENT DOCUMENTS

| 7,852,883 B2* | 12/2010 | Kwak et al. .................... 370/522 |
| 2007/0171889 A1* | 7/2007 | Kwon et al. .................... 370/350 |
| 2009/0016265 A1* | 1/2009 | Katayama et al. ............. 370/328 |
| 2009/0164862 A1* | 6/2009 | Sagfors et al. ................. 714/748 |
| 2010/0029322 A1* | 2/2010 | Englund et al. ............... 455/522 |
| 2011/0085495 A1* | 4/2011 | Ko et al. ........................ 370/328 |

OTHER PUBLICATIONS

"Ghosh. A, Ratasuk. R, Uplink Control Channel Design for 3GPP LTE. IEEE PIMRC 2007".
Notification of the First Chinese Office Action dated Feb. 3, 2012 received in Application No. or Patent No. 200810147511.0.

* cited by examiner

*Primary Examiner* — Andrew Lai
*Assistant Examiner* — Syed M Bokhari
(74) *Attorney, Agent, or Firm* — Murphy & King, P.C.

(57) ABSTRACT

The present invention discloses a transmission resource assignment method for response signals, a feedback method of response signals and a processing method of response signals. The transmission resource assignment method for response signals according to the present invention includes the steps of: determining a list of mobile stations required to transmit response signals currently; determining the number of the response signals required to be transmitted by each mobile station; and assigning a frequency-domain sequence and a time-domain sequence for each mobile station to transmit the response signals; wherein for multiple mobile stations assigned with the same frequency-domain sequence, the time-domain sequence assigned to the mobile station required to transmit multiple response signal groups is divided into multiple subsequences to be used to transmit the multiple response signal groups of the mobile station respectively; and parts of the time-domain sequences of different mobile stations corresponding to the multiple subsequences are orthogonal to each other respectively.

16 Claims, 10 Drawing Sheets

TRANSMISSION RESOURCE ASSIGNING METHOD, FEEDBACK METHOD AND PROCESSING METHOD FOR RESPONSE SIGNALS

FIELD OF INVENTION

The present invention relates to a wireless communication system, and more particularly, to a transmission resource assigning method, a feedback method and a processing method for response signals in a wireless communication system.

BACKGROUND OF THE INVENTION

In a wireless communication system, a base station can transmit/receive data to/from one or more subscribers simultaneously. Generally, a communication link from a base station to a subscriber is called as a downlink, and a communication link from a subscriber to a base station is called as an uplink. In the uplink, it is necessary for the subscriber to transmit uplink control signaling, such as a bandwidth request signal for requesting bandwidth, an acknowledgement signal for a downlink data package, etc. to the base station, so as to support data transmission in the downlink. In the system design, it is required to consider how to reduce the overhead of uplink control signaling transmitted on the uplink as much as possible so as to improve the spectral efficiency of the system.

The acknowledgement signal for the downlink data package is one kind of uplink control signaling, and is used in the communication between the base station and a mobile station. It has two states, i.e. ACK and NACK. As shown in FIG. 1, a data transmission process between the base station and the mobile station is illustrated. Firstly, the process starts from step S11, and the base station transmits data to the mobile station via a downlink at step S12. Then, the subscriber receives and decodes the data at step S13, and determines whether the decoding is correct at step S14. If the decoding is correct, the mobile station transmits to the base station a control signal of ACK indicating that the decoding is success at step S15. The base station may transmit a new data package to the mobile station at step S16, and the flow of this data transmission is terminated at step S19.

On the other hand, if it is determined at step S14 that the decoding is not correct, the mobile station transmits to the base station a control signal of NACK indicating that the data package decoding fails at step S17. The base station retransmits the previously transmitted data at step S18. Then the process returns to step S13 and the subscriber resumes to receive data.

As can be seen from the above description, the acknowledgement signal for the downlink data package is essentially a control signal which represents a successful data decoding (ACK) or a failed data decoding (NACK). For the purpose of easy explanation, the acknowledgement signal for the downlink data package hereafter may be abbreviated as a response signal or an ACK signal, as long as this does not incur any ambiguity.

When the fixed resources assigned by the base station are used to the transmission of uplink ACK signal, the ACK signal of multiple subscribers may be transmitted in multiplex through various approaches. The various approaches include, for example, Time Division Multiplex (TMD) in which the multiple subscribers occupy different time resources, Frequency Division Multiplex (FDM) in which the multiple subscribers occupy different frequency resources and Code Division Multiplex (CDM) in which the multiple subscribers occupy different code word resources. In comparison with TDM and FDM, to employ the resource assignment approach of CDM can provide assignable resources more effectively and provide a better performance in bit error rate of uplink control signals, and thus are applied widely in today's wireless communication systems. For example, the Long Term Evolution (LTE) system of 3GPP has been specified to take CDM as a frequency-domain multiplex approach for an uplink ACK channel.

To transmit as more uplink control signals as possible on the assigned fixed resources, LTE also employs a time-domain spread spectrum approach. In the time-domain spread spectrum approach, an ACK bit of each subscriber is represented uniquely with a frequency-domain sequence and a time-domain sequence, and ACK bits of multiple subscribers can be multiplexed on the same resources with different frequency-domain and/or time-domain sequences and then be transmitted simultaneously.

FIG. 2 illustrates a typical multiplex approach for an uplink ACK sequence. In FIG. 2, each sub-frame includes seven Orthogonal Frequency Division Multiplexing (OFDM) symbols. The intermediate three OFDM symbols are used for transmitting pilot signals of multiple subscribers, and the remaining four symbols are used for transmitting ACK signal of the multiple subscribers.

A Constant Amplitude Zero Auto Correlation (CAZAC) sequence may be used as a frequency-domain sequence for an ACK signal or a pilot signal. The CAZAC sequence is characterized in the followings: 1) constant amplitude, that is, each element of each CAZAC sequence has the same amplitude value; and 2) zero cyclic auto-correlation, that is, the CAZAC sequences with different cyclic time shifts has zero correlation. The CAZAC sequence includes sequences such as Zadoff-Chu (ZC) sequence and General Chirp-like (GCL) sequence, etc., of which the respective sequence description may be obtained by reference to a Non-Patent Document "Ghosh. A, Ratasuk. R, Uplink control channel design for 3GPP LTE. IEEE PIMRC 2007".

A ZC sequence is described here for exemplary purpose. An expression of the ZC sequence may be represented as:

$$p(n) = \begin{cases} e^{-j\frac{2\pi l}{M}\left(n+n\frac{n+1}{2}\right)} & \text{if } M \text{ is odd, } n=0,1,\ldots,M-1 \\ e^{-j\frac{2\pi l}{M}\left(n+\frac{n^2}{2}\right)} & \text{if } M \text{ is even, } n=0,1,\ldots,M-1 \end{cases}$$

where M is a sequence length, l is an arbitrary integer, and M and l are prime numbers with respect to each other.

In FIG. 2, $F^{-1}$ denotes an IFFT operation, and the time-domain sequence for the ACK bits are denoted as $w_0$-$w_3$. A vector in a Hadamard matrix may be used as the time-domain sequence. A 4×4 Hadamard matrix may be represented as $$\begin{bmatrix} 1 & 1 & 1 & 1 \\ 1 & -1 & 1 & -1 \\ 1 & 1 & -1 & -1 \\ 1 & -1 & -1 & 1 \end{bmatrix}.$$

The value of $w_0$-$w_3$ is a row vector of the Hadamard matrix. That is, if the first row vector is selected as the time-domain sequence, $w_0$-$w_3$=[1,1,1,1]. The four row vectors of the Hadamard matrix are assigned index numbers respectively, that is, time-domain sequence 1 corresponds to a sequence [1,1,1,1], time-domain sequence 2 corresponds to a sequence [1,−1,1,−1], and so on.

The resources used for ACK signal may be continuous or non-continuous sub-carriers in the frequency domain. For example, the continuous sub-carriers are assigned as the resources, and it is assumed that these resources locate at the boundaries of the Orthogonal Frequency Division Multiplexing (OFDM) symbols as shown in FIG. 3. If twelve continuous sub-carriers are used in the frequency domain, there may be in theory twelve ZC sequences with different time shifts as frequency-domain sequences for transmitting the ACK bits. However, in practice, the ZC sequences are generally taken every two time shifts among all the ZC sequences to reduce interference, so that there are six available frequency-domain sequences.

In the time domain, three OFDM symbols are used as pilot symbols, and the remaining four symbols are used as data symbols. The pilot signals are generally used for estimating each subscriber's channel. Similar with the ACK signal, the pilot signal of each subscriber also corresponds to a frequency-domain sequence and a time-domain sequence.

In the view of pilot, there are three time-domain sequences and thus the number of the ACK bits that can be transmitted simultaneously is 6*3=18. In the view of data, since the number of the occupied time-domain OFDM symbols is 4, and six ZC sequences with different cyclic time shifts are used as the frequency-domain sequences, the number of 1-bit ACK signal that can be transmitted simultaneously is 6*4=24. Due to the one-to-one corresponding relationship between the pilots and the ACK data, the number of the ACK signal that can be transmitted simultaneously can only be the minimum value, i.e. eighteen. A resource assignment solution can be represented by table 1.

TABLE 1

ACK bit sequence assignment

| pilot/data | | index of time-domain sequence | | | |
|---|---|---|---|---|---|
| ZC sequences with different Cyclic time shifts | 1 | 2 | 3 | 4 |
| 1 | | 1 | 7 | 13 | |
| 2 | | | | | |
| 3 | | 2 | 8 | 14 | |
| 4 | | | | | |
| 5 | | 3 | 9 | 15 | |
| 6 | | | | | |
| 7 | | 4 | 10 | 16 | |
| 8 | | | | | |
| 9 | | 5 | 11 | 17 | |
| 10 | | | | | |
| 11 | | 6 | 12 | 18 | |
| 12 | | | | | |

In table 1, the index of the time-domain and frequency-domain sequences assigned to subscriber 1 is (1,1), and the index of the time-domain and frequency-domain sequences assigned to subscriber 2 is (1,3). Totally eighteen subscribers can transmit 1 bit of ACK signal simultaneously The ACK bit transmitted by each subscriber occupies a different time-domain sequence and/or a different frequency-domain sequence.

After receiving the ACK signal simultaneously transmitted by the multiple subscribers, the base station employs a typical receiving method as shown in FIG. 4. The receiving process of the base station is described as follows by an example in which the base station receives the ACK signal of a certain subscriber k. As shown in FIG. 4, after receiving the multiplexed ACK data of the multiple subscribers, the base station multiplies each of the received OFDM symbols by the time-domain sequence (w0,w1,w2,w3) of the subscriber k and sums the resulting sequences at step S41, and then executes an FFT operation on the resulting sequence at step S42. Then, at step S43, the base station performs an equalization on the resulting sequence according to channel estimation value obtained in advance from the pilots of the subscriber to eliminate the influence of a wireless channel, and then performs a correlating process on the resulting sequence with a frequency-domain sequence p(n) corresponding to the subscriber k at step S44. Finally, the base station compares at step S45 the result obtained at step S44 with a predefined threshold value. If the result is greater than the threshold value, it means that an NACK signal is transmitted by the subscriber k. If the result is less than the threshold value, it means that an ACK signal is transmitted by the subscriber k.

The case as described above is a case that each subscriber feeds back only one ACK signal, i.e. one ACK bit. However, in many cases, some subscribers in the system need to feed back multiple bits of ACK signal simultaneously, such as in a Multi-Codewords (MCW) multiple input multiple output (MIMO) system or a Time Division Duplexing (TDD) system, etc. In the case that some subscribers need to feed back multiple bits of ACK signal simultaneously, how to flexibly assign the time-domain sequence and the frequency-domain sequence corresponding an uplink ACK bit in the system has become an interesting focus.

SUMMARY OF THE INVENTION

In view of the above, the present invention proposes a transmission resource assigning method, a feedback method and a processing method for response signals in a wireless communication system. The methods according to the present invention are applicable to a multiple-carrier or single-carrier communication system using OFDM technology, such as an Orthogonal Frequency Division Multiple Addressing (OFDMA) system, a Single Carrier Frequency Division Multiple Addressing (SC-FDMA) system. etc.

According to an aspect of the present invention, there is provided a transmission resource assigning method for response signals including the steps of: determining a list of mobile stations required to transmit response signals currently; determining the number of the response signals required to be transmitted by each mobile station; and assigning a frequency-domain sequence and a time-domain sequence for each mobile station to transmit the response signals; wherein for multiple mobile stations assigned with the same frequency-domain sequence, the time-domain sequence assigned to the mobile station required to transmit multiple response signal groups is divided into multiple subsequences to be used to transmit the multiple response signal groups of the mobile station respectively; and parts of the time-domain sequences of different mobile stations corresponding to the multiple subsequences are orthogonal to each other respectively. The response signal is a signal representing a successful decoding of a data package or a signal representing a failed decoding of the data package.

According to an embodiment of the present invention, in the case where the mobile stations assigned with the same frequency-domain sequence comprise a first mobile station comprising one response signal group including 2 bits of response signals and a second and a third mobile stations comprising 1 bit of response signal respectively, the time-domain sequence is from a 4×4 Hadamard matrix $$\begin{vmatrix} 1 & 1 & 1 & 1 \\ 1 & -1 & 1 & -1 \\ 1 & 1 & -1 & -1 \\ 1 & -1 & -1 & 1 \end{vmatrix};$$

assigning any row vector of the Hadamard matrix to the first mobile station, the first half sub vector of the row vector being assigned to the first bit of response signal in the response signal group of the first mobile station, and the second half sub vector of the row vector being assigned to the second bit of response signal; assigning to the second mobile station a row vector of the Haramard matrix which is different from the row vector assigned to the first mobile station, the first half and second half sub vectors of the row vector assigned to the second mobile station being orthogonal to the corresponding parts of the row vector assigned to the first mobile station respectively; and assigning to the third mobile station a row vector of the Haramard matrix which is different from the row vectors assigned to the first and second mobile stations, the first half and second half sub vectors of the row vector assigned to the third mobile station being orthogonal to the corresponding parts of the row vector assigned to the first mobile station.

According to another embodiment of the present invention, in the case where the mobile stations assigned with the same frequency-domain sequence comprise a first mobile station comprising one response signal group including 2 bits of response signals and a second mobile station comprising one response signal group including 2 bits of response signals, the time-domain sequence is from a 4×4 Hadamard matrix $$\begin{vmatrix} 1 & 1 & 1 & 1 \\ 1 & -1 & 1 & -1 \\ 1 & 1 & -1 & -1 \\ 1 & -1 & -1 & 1 \end{vmatrix},$$

assigning any row vector of the Hadamard matrix to the first mobile station, the first half sub vector of the row vector being assigned to the first bit of response signal in the response signal group of the first mobile station, the second half sub vector of the row vector being assigned to the second bit of response signal; and assigning to the second mobile station an another row vector of the Haramard matrix which is different from the row vector assigned to the first mobile station, the first half sub vector of the another row vector being assigned to the first bit of response signal in the response signal group of the second mobile station, the second half sub vector of the another row vector being assigned to the second bit of response signal, and the first half and second half sub vectors of the another row vector being orthogonal to the corresponding parts of the row vector assigned to the first mobile station.

Additionally, in the case that the response signal group includes more than one response signal, modulation is performed on response signals of the response signal group containing more than one response signal, and the modulated signal is mapped to the corresponding frequency-domain sequence and time-domain sequence.

According to a preferred embodiment of the present invention, each response signal group includes 2 bits of response signals, and the 2 bits of response signals are modulated into 1 bit of QPSK symbol by means of ON-OFF keying.

When a mobile station with one response signal group transmits the response signals by means of ON-OFF keying, if any bit of response signal in the response signal group represents a successful decoding of a data package, no data will be transmitted in the corresponding two OFDM symbols for transmitting the any bit of response signal; if any bit of response signal in the response signal group represents a failed decoding of the data package, data will be transmitted in the two OFDM symbols for transmitting the any bit of response signal according to the assigned frequency-domain sequence and sub vector of the time-domain sequence.

Preferably, when assigning sequences for all mobile stations required to transmit the response signals, the time-domain sequences are evenly assigned to each mobile station, and each time-domain sequence is assigned substantially for the same times.

According to another aspect of the present invention, there is provided a feedback method of response signals including the steps of: determining a frequency-domain sequence and a time-domain sequence for transmitting a response signal; determining a sub sequence permitted to be used to transmit the response signal in the time-domain sequence; and transmitting the response signal by using the determined sub sequence and the frequency-domain sequence for transmitting the response signal.

The feedback method of response signals according to a preferred embodiment of the present invention further includes the step of determining a signal representing a failed decoding of a data package. In the step of transmitting the response signal, the determined sub sequence and the frequency-domain sequence for transmitting the response signal is used to only transmit the signal representing the failed decoding of the data package.

Preferably, the response signals are grouped into multiple response signal groups, and the number of the response signal groups is equal to the number of the sub sequences of the time-domain sequence permitted to be used to transmit the response signals. In the step of transmitting the response signal, the multiple response signal groups are transmitted by using different sub sequences and frequency-domain sequences.

Additionally, in the case that the response signal group includes more than one response signal, modulation is performed on the response signals of the response signal group containing more than one response signal, and the modulated signal is mapped to the corresponding frequency-domain sequence and time-domain sequence.

When a mobile station with one response signal group transmits the response signals by means of ON-OFF keying, if any bit of response signal in the response signal group represents a successful decoding of a data package, no data will be transmitted in the corresponding two OFDM symbols for transmitting the any bit of response signal; if any bit of response signal in the response signal group represents a failed decoding of the data package, data will be transmitted in the two OFDM symbols for transmitting the any bit of response signal according to the assigned frequency-domain sequence and sub vector of the time-domain sequence.

According to a further aspect of the present invention, there is provided a processing method of response signals including the steps of: determining the number of the response signals; correlating the OFDM symbols corresponding to each response signal with a corresponding time-domain sequence; correlating the sequence obtained after correlating with the corresponding time-domain sequence with a frequency-domain sequence corresponding to the response signal in frequency-domain; and comparing the correlation value obtained after correlating in the frequency-domain with a predefined threshold value to determine the contents of the response signal.

Preferably, when the correlation value is greater than the threshold value, the response signal is a signal representing a failed decoding of a data package; and when the correlation value is less than or equal to the threshold value, the response signal is a signal representing a successful decoding of a data package.

In a preferred embodiment of the present invention, the response signal is a signal obtained by performing modulation on multiple bits of response signals and mapping the modulated signal to the corresponding frequency-domain sequence and time-domain sequence.

The processing method of response signals according to another embodiment of the present invention further includes an equalization step before the correlating in the frequency domain. The equalization process is performed on the sequence resulting from the correlating with the corresponding time-domain sequence, according to the channel estimation value obtained from the pilot of the mobile station transmitting the response signal.

Preferably, the frequency-domain sequence comprises a Constant Amplitude Zero Auto Correlation (CAZAC) sequence with different cyclic time shifts. The CAZAC sequence includes a ZC sequence or a GCL sequence.

Additionally, the present invention also provides a computer program for implementing the above methods.

Additionally, the present invention also provides a computer program product in the form of at least computer readable medium, on which computer program codes for implementing the above methods are recorded.

BRIEF DESCRIPTION OF THE DRAWINGS

The above and other objects, features and advantages of the present invention will be more apparent by referring to the following description of the embodiment of the present invention given in conjunction with the accompanying drawings. The same or corresponding technical features or components are denoted with the same or corresponding reference signs in the drawings, in which.

DESCRIPTION OF THE PREFERRED EMBODIMENTS

Figure 1:
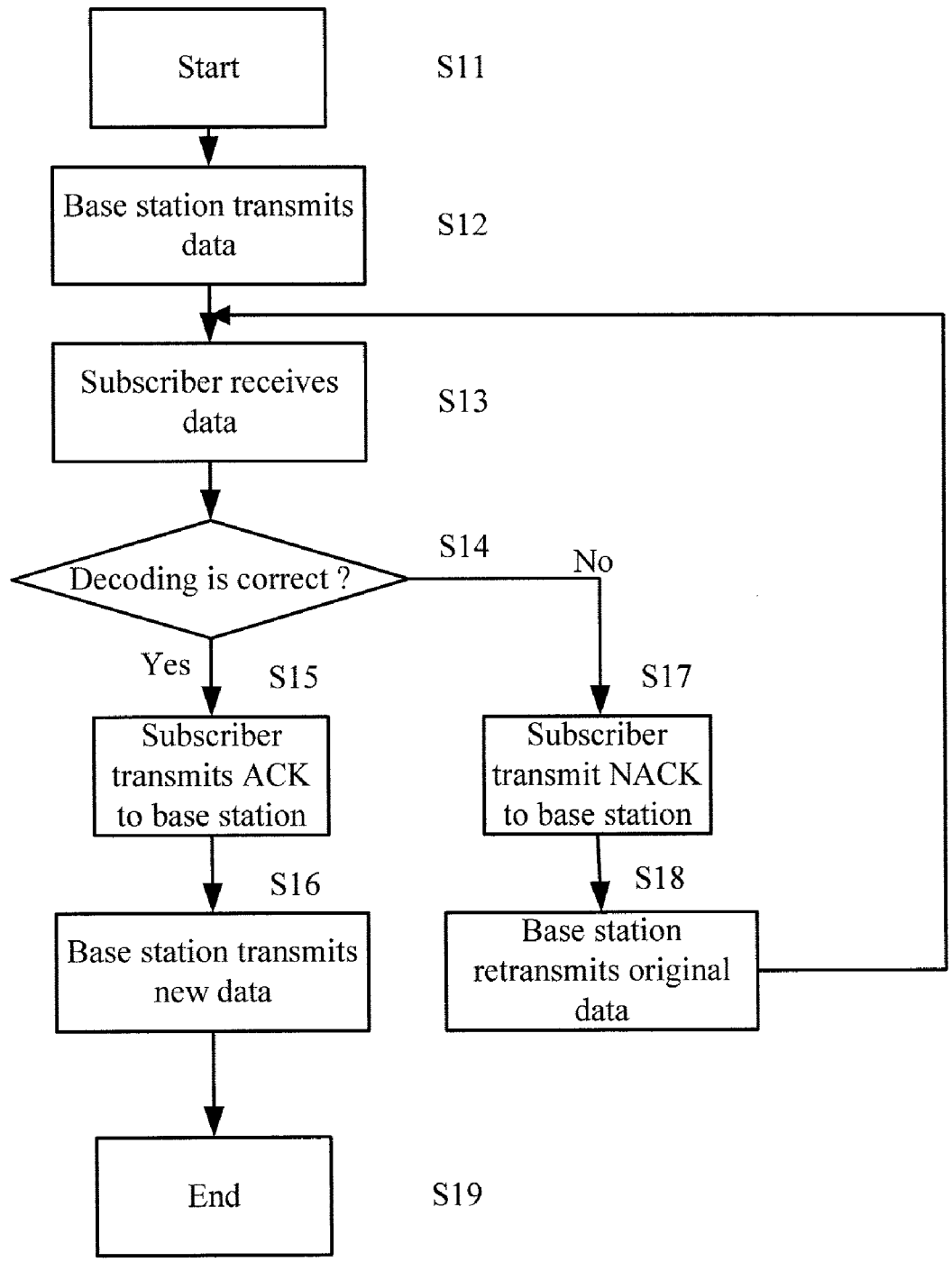
FIG. 1 is a flow chart illustrating a data transmission process between a base station and a mobile station.

The embodiments of the present invention will be described hereafter with reference to the accompanying drawings. It should be noted that for the purpose of clarity, the presentation and description of the components and processes which are not relative to the present invention and/or are well known to those skilled in the art are omitted in the drawings and the description.

The principle of a transmission resource assigning method, a feedback method and a processing method for response signals according to the present invention will be described now with reference to the accompanying drawings, particularly with reference to FIGS. 5-7.

Figure 5:
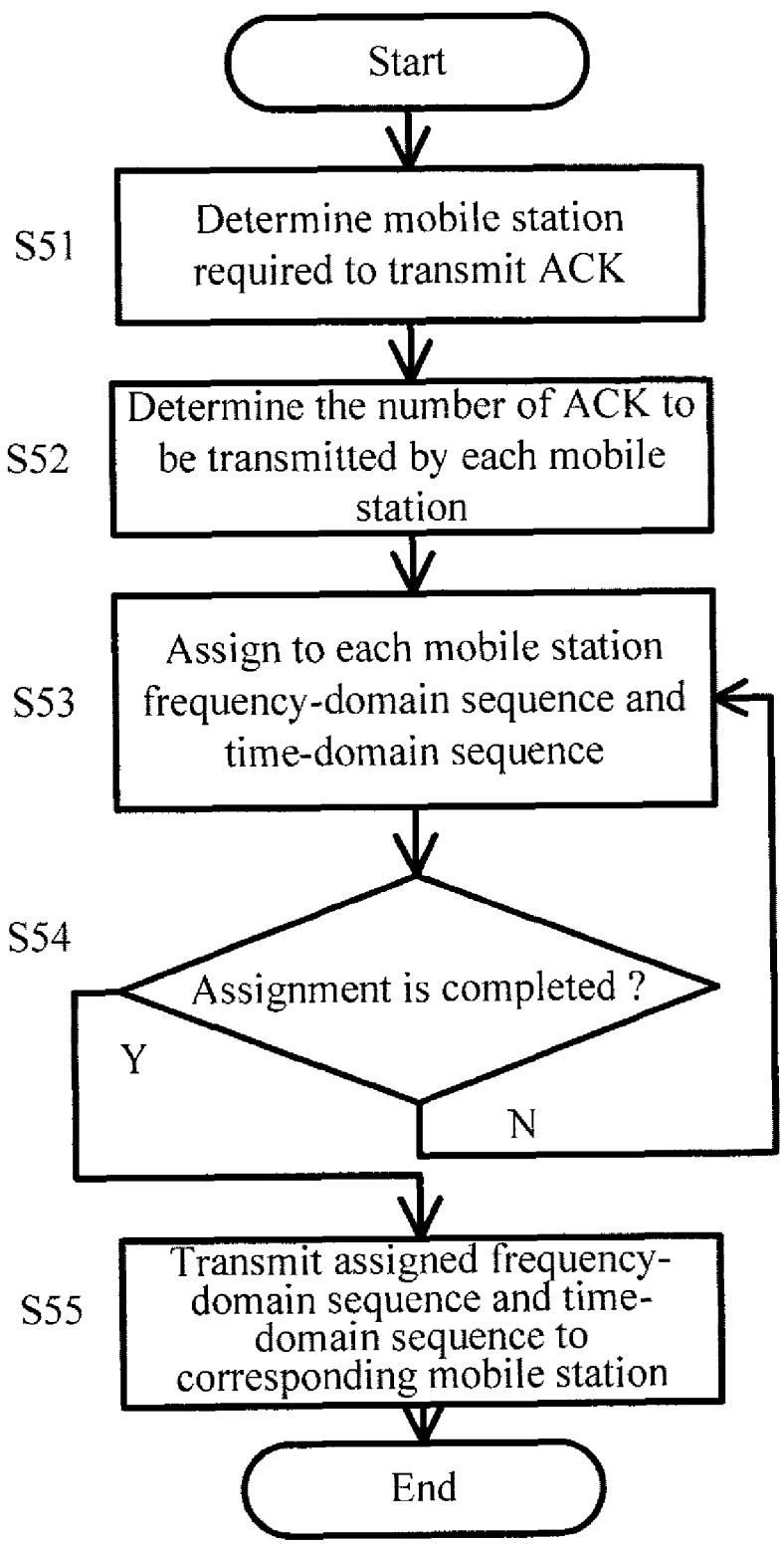
FIG. 5 illustrates a flow chart of a transmission resource assignment method for response signals according to an embodiment of the present invention.

FIG. 5 illustrates a flow chart of a transmission resource assignment method for response signals according to an embodiment of the present invention. As shown in FIG. 5, a base station determines at step S51 a list of the mobile stations required to transmit a response signal (i.e., ACK signal) currently, and then determines at step S52 the number of the ACK signal required to be transmitted by each mobile station.

Then, at step S53, the base station assigns a frequency-domain sequence and a time-domain sequence for each mobile station to transmit the ACK signal. For multiple mobile stations assigned with the same frequency-domain sequence, the time-domain sequence assigned to the mobile station which transmits multiple ACK signal groups is divided into multiple subsequences to be used to transmit the multiple ACK signal groups of this mobile station respectively. Here, parts of the time-domain sequences of different mobile stations corresponding to the multiple subsequences are orthogonal to each other respectively.

Then, at step S54, the base station determines whether all mobile stations required to transmit a response signal have been assigned transmission resources. If the assignment has not been completed, the process returns to step S53 and the base station continues to assign transmission resources.

If it is determined at step S54 that the assignment of transmission resources has been completed, the base station transmits the frequency-domain sequence and the time-domain sequence assigned to each mobile station to the respective mobile station at step S55, thereby completing the transmission resource assignment process of the response signals.

Before transmitting the transmission resources to each mobile station, if an ACK signal group includes multiple ACK signals, it is required to modulate the ACK signal group including more than one ACK signal and then map the modulated signal onto the assigned frequency-domain sequence and time-domain sequence. For example, for an ACK signal group including 2 bits of ACK signal, the 2 bits of ACK signal can be modulated into 1 bit of QPSK symbol by means of ON-OFF keying.

It should be noted that when assigning sequences for all mobile stations which transmit an ACK signal, it is preferred that the time-domain sequences are evenly assigned to each mobile station, and each time-domain sequence is assigned substantially for the same times.

Figure 6:
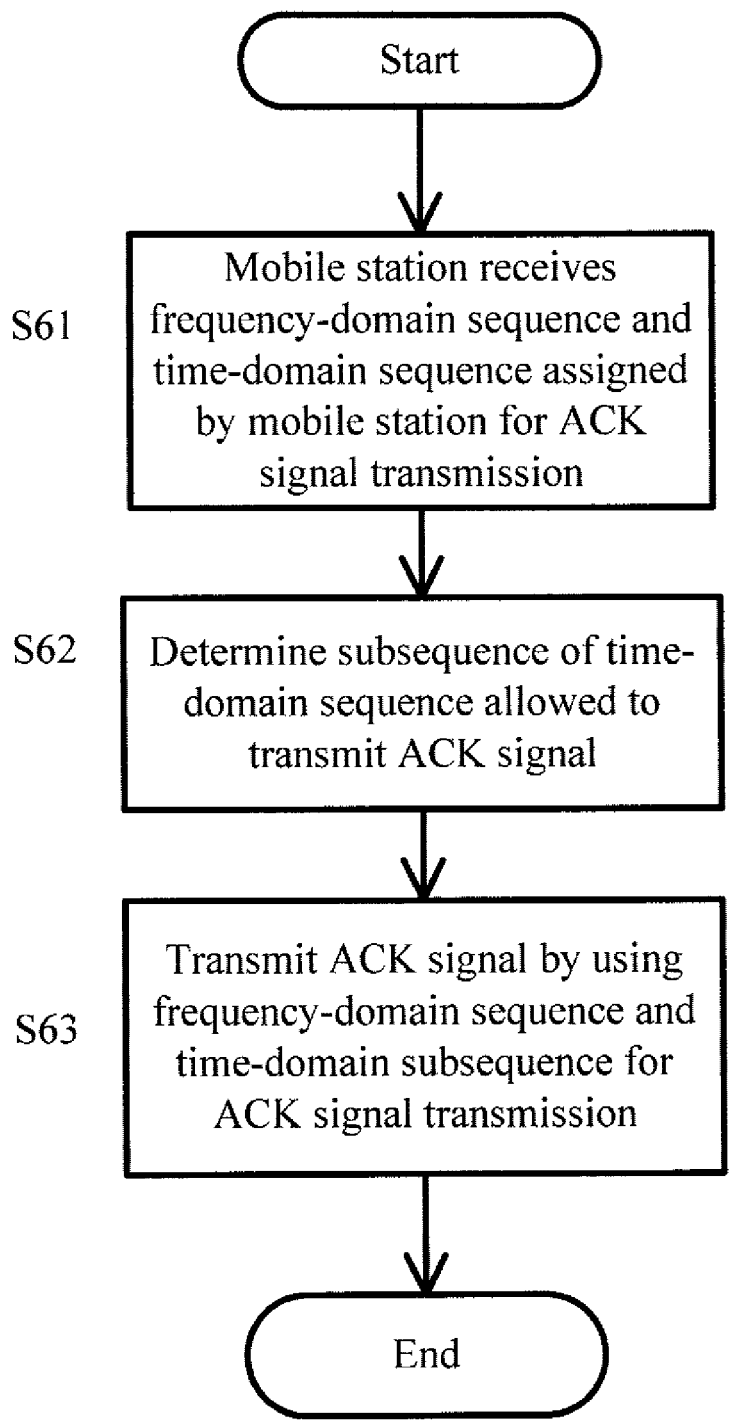
FIG. 6 illustrates a flow chart for a feedback method of response signals according to an embodiment of the present invention.

After receiving from the base station the assigned frequency-domain sequence and the time-domain sequence for transmitting an ACK signal, the mobile station will perform a feedback process of an ACK signal by using the assigned transmission resources as shown in FIG. 6. FIG. 6 illustrates a flow chart for a feedback method of response signals according to an embodiment of the present invention.

In FIG. 6, the mobile station receives at step S61 the frequency-domain sequence and the time-domain sequence assigned by the base station for ACK signal transmission, and then determines at step S62 the subsequences of the time-domain sequence that allow to be used for ACK signal transmission. Finally, at step S63, the mobile station transmits the ACK signal by using the frequency sequence and the subsequences determined for ACK signal transmission.

In addition, before step S63, the mobile station also determines a signal representing a failed decoding of a data package. Then at step S63, the mobile station transmits only the signal representing the failed decoding of the data package by using the frequency-domain sequence and the determined subsequences for ACK signal transmission, but does not transmit a signal representing a successful decoding of the data package. More particularly, when the mobile station transmits ACK signal by means of ON-OFF keying, if any bit of ACK signal represents a successful decoding of the data package, no data will be transmitted in the corresponding two OFDM symbols for transmitting the any bit of ACK signal; if any bit of ACK signal represents a failed decoding of the data package, data will be transmitted in the corresponding two OFDM symbols for transmitting the any bit of ACK signal according to the assigned frequency-domain sequence and subsequence of the time-domain sequence.

Before transmitting the ACK signal, the mobile station groups the ACK signal into multiple ACK signal groups of which the number is equal to the number of the subsequences of the time-domain sequence allowed to be used to transmit the ACK signal. In step S63, the multiple ACK signal groups are transmitted by using different subsequence and the frequency-domain sequence.

Similarly, in the case that an ACK signal group includes multiple ACK signals, it is necessary to modulate the ACK signal group including more than one ACK signal, and then the modulated signal are mapped onto the assigned frequency-domain sequence and time-domain sequence.

While the mobile station transmits the ACK signal by using the frequency-domain sequence and the time-domain sequence assigned by the base station, the base station receives and processes the ACK signal so as to determine whether the data transmission is successful. FIG. 7 illustrates a flow chart for a processing method of response signals according to an embodiment of the present invention.

Figure 7:
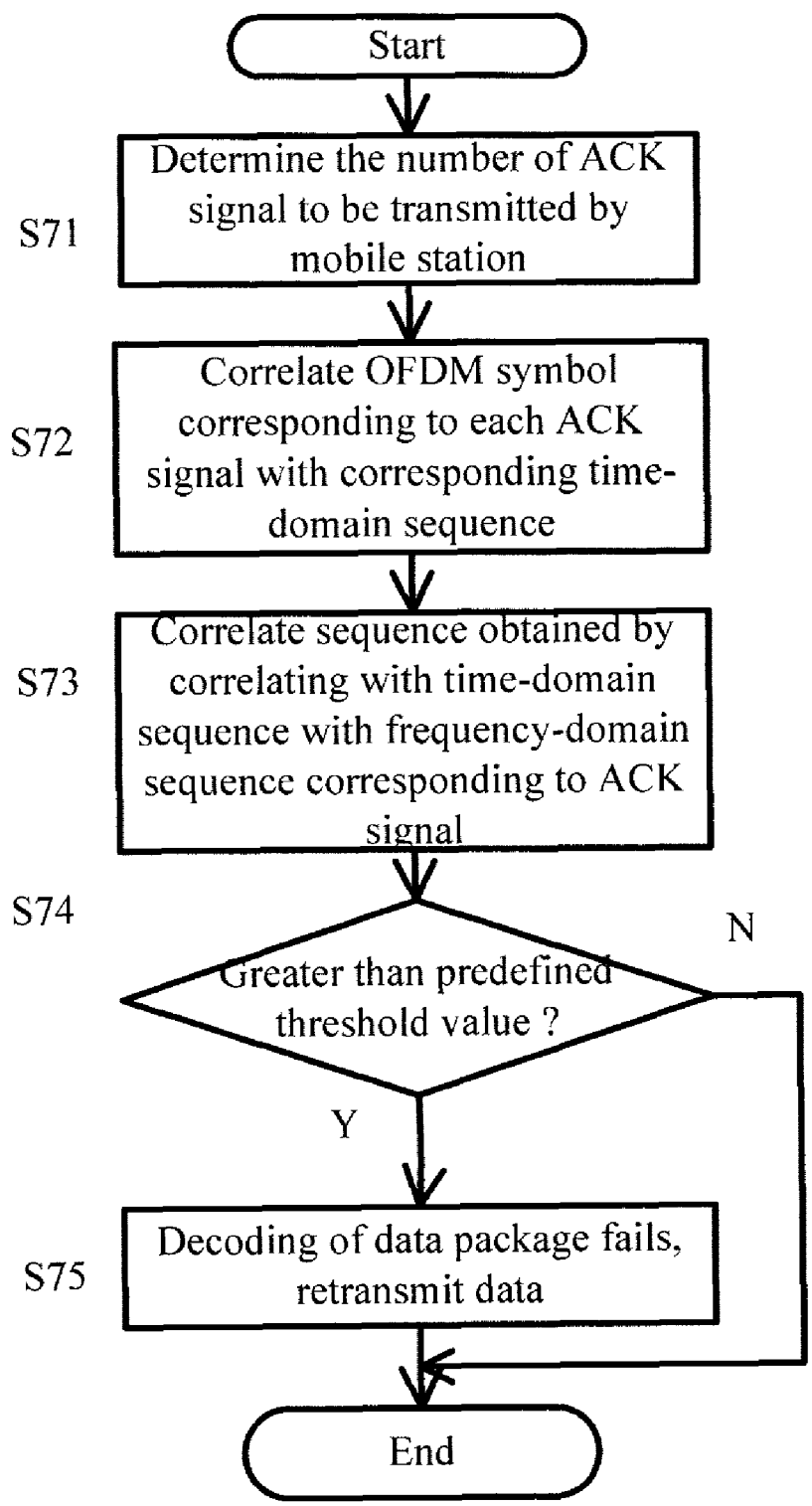
FIG. 7 illustrates a flow chart for a processing method of response signals according to an embodiment of the present invention.

As shown in FIG. 7, the base station determines at step S71 the number of the ACK signal transmitted by the mobile station, correlates at step S72 the OFDM symbol corresponding to each ACK signal with the corresponding time-domain sequence, and correlates at step S73 the sequence obtained by correlating with the corresponding time-domain sequence with the frequency-domain sequence corresponding to the ACK signal in the frequency domain.

After correlating in the frequency-domain and obtaining a corresponding correlation value, the base station compares at step S74 the correlation value with a predefined threshold value to determine the contents of the ACK signal. If the correlation value is less than or equal to the threshold value, the ACK signal represents a successful decoding of the data package and the processing process is terminated.

On the other hand, if it is determined at step S74 that the correlation value is greater than the threshold value, the ACK signal represents a failed decoding of the data package and the processing process proceeds to step S75. At step S75, the base station resumes to transmit the data package.

Here, the ACK signal may be a signal obtained by modulating multiple bits of ACK signal and mapping the modulated signal into a corresponding frequency-domain sequence and a corresponding time-domain sequence. In this case, the base station is required to demodulate the ACK signal correspondingly.

It is preferred to perform an equalization process before the correlating in the frequency domain. The equalization process is performed on the sequence resulting from the correlating with the corresponding time-domain sequence, according to the channel estimation value obtained from the pilot of the mobile station transmitting the ACK signal.

The principle of the transmission resource assignment method, feedback method and processing method for response signals according to the present invention are described above with reference to the accompanying drawings. The present invention will be further described hereafter in detail by an example in that the ACK signal to be transmitted by a mobile station are 2 bits of ACK signal.

As described above, in uplink transmitting one bit of ACK signal of a certain mobile station, the one bit of ACK signal corresponds to a frequency-domain sequence and a time-domain sequence, and the sequences used for multiple mobile stations are multiplexed onto the same time-frequency resource and transmitted simultaneously. The frequency-domain sequence may be a CAZAC sequence, typically like a ZC sequence or a GCL sequence, etc. for example. For the time-domain sequence, there may be many choices, such as a CAZAC sequence and a vector of a Hadamard matrix, etc. The ZC sequence and the Hadamard sequence are used herein as specific examples of the time-domain sequence and frequency-domain sequence to detail the present invention. Other sequences may also be used in a similar manner.

Figure 2:
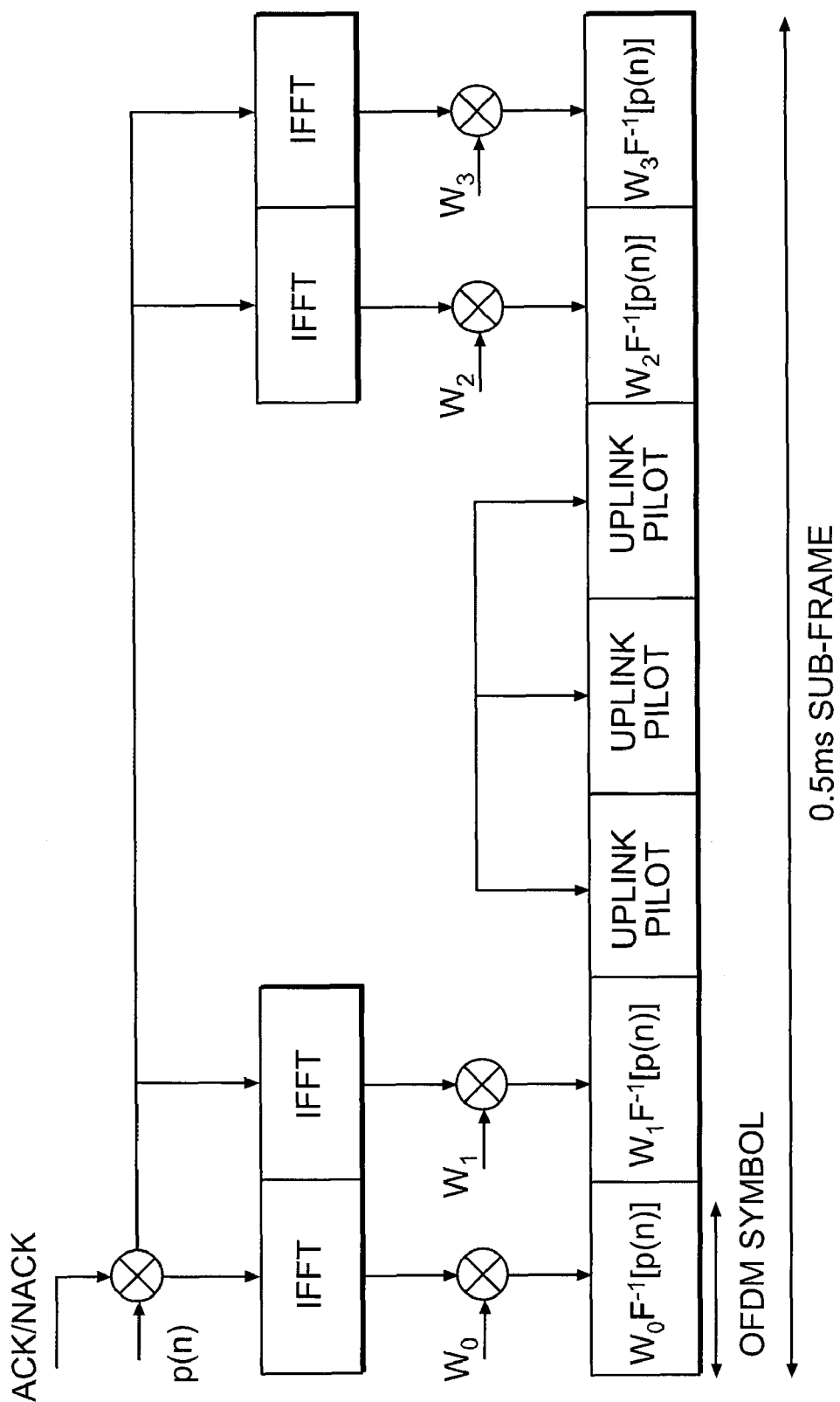
FIG. 2 illustrates a typical multiplex approach for an uplink ACK sequence.
Figure 3:
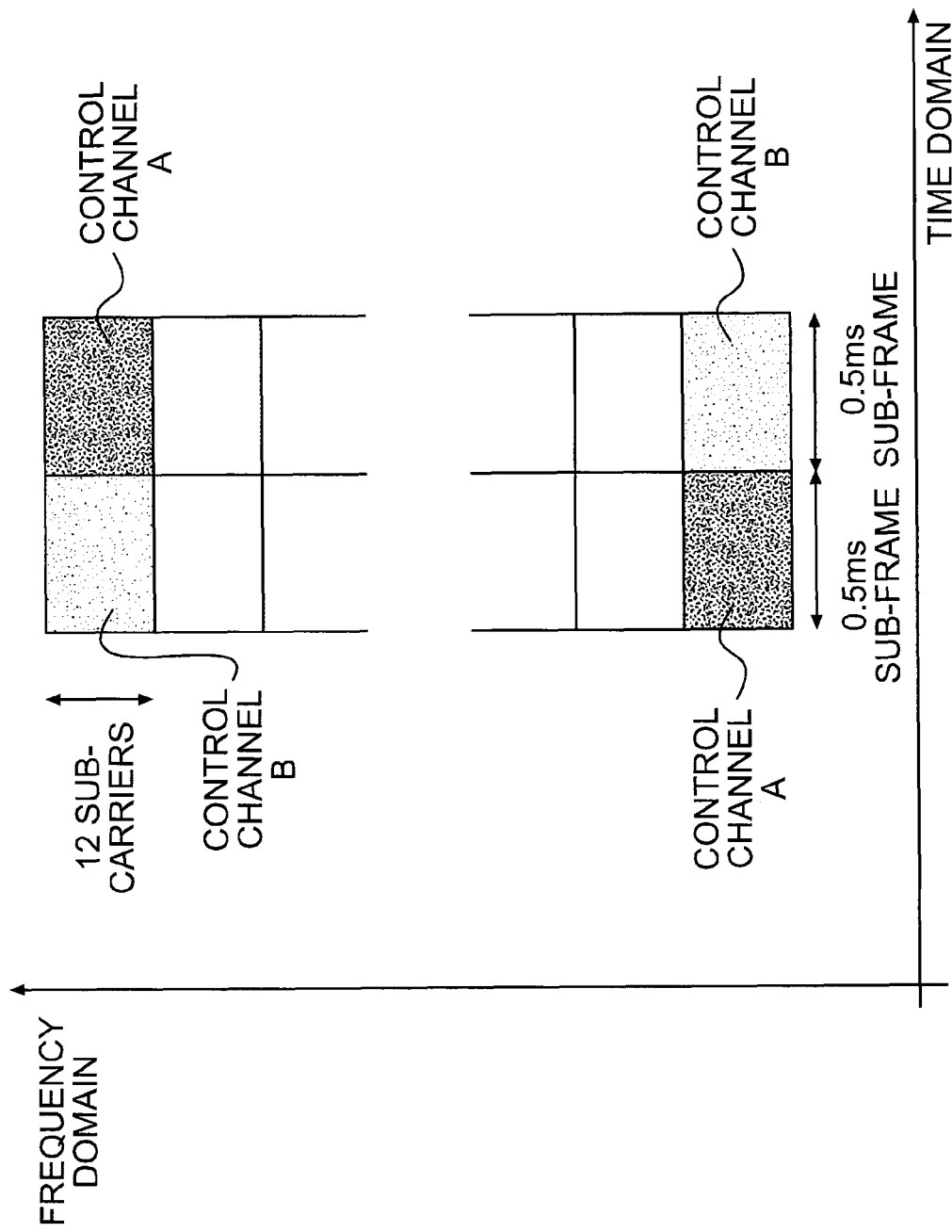
FIG. 3 is a diagram illustrating assignment of an uplink ACK channel.

As described above, to assign sequences with the ACK channel assignment approach as shown in FIG. 2, a sequence can be selected from any combination of six ZC sequences and four Hadamard vectors as the sequence to transmit the ACK signal of the subscriber. Therefore, there is the case that two or more subscribers use the same frequency-domain sequence but different time-domain sequence.

In practice, if a certain mobile station is required to feed back multiple bits of ACK signals, additional orthogonal resources may be assigned to that mobile station. In the case that the frequency-domain sequence keeps not changed, each bit of the ACK signals of the mobile station can be assigned with a different time-domain sequence. If the time-domain sequence keeps not changed, each bit of the ACK signals of the mobile station can be assigned with a different frequency-domain sequence. Certainly, the resources of the time-domain sequence and the frequency-domain sequence both can be changed. In this case, each bit of the ACK signals of the mobile station is assigned with a corresponding time-domain sequence and a corresponding frequency-domain sequence.

However, no matter which of the above solutions is employed, the mobile station is required to feed back multiple sequences simultaneously in each OFDM symbol of one sub-frame, and the ACK signal superposed in the time domain will result in a high Peak-to-Average Power Ratio (PAPR). Here the PAPR represents a ratio of a peak power to an average power of data waves. Too high PAPR will adversely affect the operation cost and efficiency of the entire system. For example, if frequency-domain sequence 1 is used to transmit one bit of ACK signal, the PAPR thereof is 2.04, and if frequency-domain sequence 1 and frequency-domain sequence 3 are used to transmit two bits of ACK signals, the PAPR after the multiplex may be up to 3.42.

If the above method is not adopted and the multiple bits of ACK signal are still transmitted with only one time-domain sequence and one frequency-domain sequence, the multiple bits of ACK signal may be modulated beforehand. For example, the ACK signal with two, three and four bits may be modulated with QPSK, 8 PSK and 16 QAM respectively. Then the modulated signal is mapped onto the corresponding frequency-domain sequence and time-domain sequence for transmission. For example, to transmit two bits of ACK signal simultaneously, QPSK is used for modulation and it is assumed to use ON-OFF keying for data transmission, and the following table 2 may be obtained.

TABLE 2

ACK signal modulation

| ACK signal | QPSK symbol |
| --- | --- |
| ACK ACK | No data transmission |
| ACK NACK | −1 |
| NACK ACK | −j |
| NACK NACK | j |

Here the ON-OFF keying refers to that if the response signal to be transmitted is an ACK signal, no data is transmitted, and if the response signal to be transmitted is an NACK signal, the corresponding time-domain sequence and frequency-domain sequence are transmitted. Accordingly, it can be known from table 2 that in transmitting two bits of ACK signal with QPSK, it is required to modulate the two bits of ACK signal into one QPSK symbol for transmission as long as either of the two bits of ACK signal is an NACK, resulting in interference to ACK signal transmission of other subscribers. In practice, if a certain mobile station uses QPSK modulation in ACK signal transmission, in comparison with the detecting of 1 bit of ACK signal, the base station will have about 3 dB loss in detecting the ACK signal modulated with QPSK.

In view of this, the present invention designs another solution in which multiple bits of ACK signal are still transmitted with one time-domain sequence and one frequency-domain sequence.

Here the following cases are considered. First, the resources available for ACK signal are more than that available for pilots. The resource assignment for ACK data signal can be relatively flexible because the pilot resources occupy three OFDM symbols in the time domain while the resources for transmitting the ACK signal occupy four OFDM symbols in the time domain. Second, due to that the time-domain sequence is greatly influenced by Doppler frequency shift, to maintain the correlation of the time-domain sequence, the base station generally assigns the same frequency-domain sequence and different time-domain sequences to multiple low-speed mobile stations.

Figure 10:
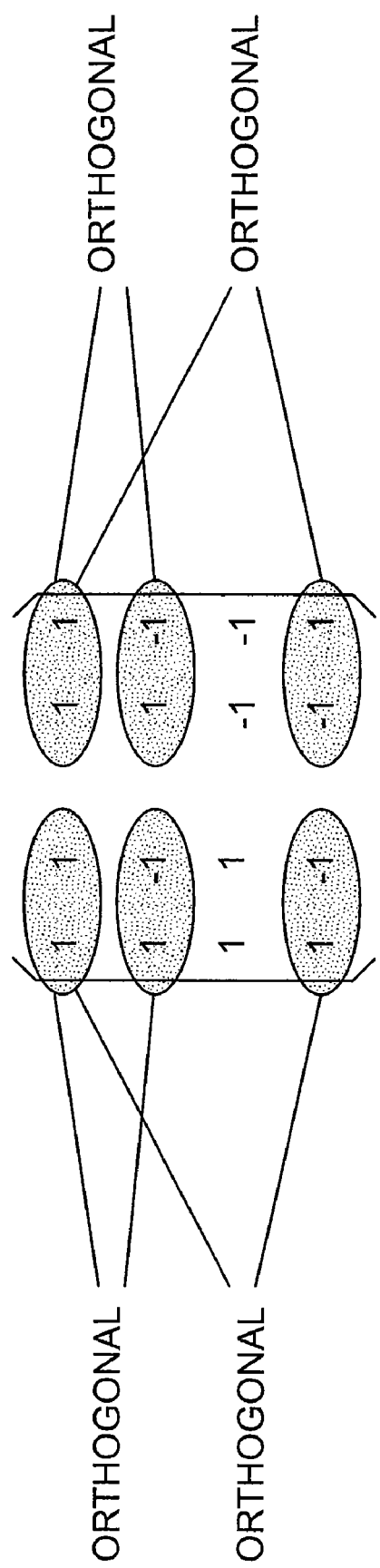
FIG. 10 illustrates the vectors of the Hadamard matrix.

Under the above condition, the time-domain sequence is considered, for example, the vectors of the Hadamard matrix as shown in FIG. 10.

The 4×4 Hadamard matrix as shown in FIG. 10 may be divided into two parts from left to right. For example, the first row (1,1,1,1) may be divided into two sub vectors (1,1) and (1,1), the second row (1,−1,1,−1) may be divided into two sub vectors (1,−1) and (1,−1), and so on. It can be seen that the two sub vectors (1,1) and (1,1) of the first row are orthogonal to the two corresponding sub vectors of the second row and the forth row, respectively. Expanded to general situations, for two sub vectors of any vector v in this matrix, there may be two other vectors u and w of the matrix whose sub vectors are orthogonal to the two sub vectors of vector v, respectively. For the 4×4 Hadamard matrix shown in FIG. 10, the correspondence relationship may be represented as the following table 3.

TABLE 3 orthogonal correspondence relationship of sub vectors

| Index of vector | Indexes of vectors whose sub vectors are orthogonal respectively |
| --- | --- |
| 1 | 2, 4 |
| 2 | 1, 3 |
| 3 | 2, 4 |
| 4 | 1, 3 |

In this way, the base station can schedule the subscriber to transmit ACK signal according to the correspondence relationship shown in table 3. For example, if at a given time the base station schedules subscriber 1, subscriber 2 and subscriber 3 to transmit ACK information simultaneously, and subscriber 1 is required to transmit 2 bits of ACK signal and subscriber 2 and subscriber 3 are required to transmit 1 bit of ACK signal respectively, the sequence assignment at this time may be: 1) subscriber 1 is assigned with a time-domain sequence with an index of 1, i.e. (1,1,1,1), and the first bit of ACK signal is assigned with a sub vector (1,1) and the second bit of ACK signal is assigned with a sub vector (1,1); 2) according to table 3, subscriber 2 is assigned with a time-domain sequence with an index of 2, i.e. (1,−1,1,−1) for the transmission of subscriber 2's ACK bit; and 3) according to table 3, subscriber 3 is assigned with a time-domain sequence with an index of 4, i.e. (1,−1,−1,1) for the transmission of subscriber 3's ACK bit.

In this way, it can be ensured that the sequence corresponding to each ACK bit transmitted by each subscriber is orthogonal to each other. In ACK signal transmission with ON-OFF keying, using the first row of vector of the Hadamard matrix as a time-domain vector to transmit two bits of ACK signal may have the following cases as shown in table 4.

TABLE 4 time-domain sequence assignment

| Time sequence | Bit 1 | Bit 2 |
| --- | --- | --- |
| (1, 1, 1, 1) | NACK | NACK |
| (1, 1, x, x) | NACK | ACK |
| (x, x, 1, 1) | ACK | NACK |
| (x, x, x, x) | ACK | ACK |

In table 4, x represents that no signal is transmitted. As known from table 4, a corresponding sequence is transmitted only when a certain bit is an NACK signal. For example, in the case that in two data flows of a certain mobile station, the decoding of the first data package is successful while the decoding of the second data package fails, the corresponding time-domain sequence is (x,x,1,1). In this case, in the four OFDM symbols for ACK signal transmission as shown in FIG. 2, the first two symbols does not transmit any data of the mobile station and the last two OFDM symbols transmit the corresponding NACK signals of the second data flow. Therefore, for the first two OFDM symbols, the interference of the mobile station to the other mobile stations that transmit ACK signal simultaneously is zero, and for the last two OFDM symbols, the interference of the mobile station to the other mobile stations is equal to the interference generated when the mobile station transmits 1 bit of ACK data. Therefore, in comparison with the method in which the ACK signal is modulated and then transmitted, the so designed method according to the present invention can reduce interference to other subscribers.

Based on the same principle, two subscribers both required to transmit 2 bits of ACK signal can also be scheduled to occupy the same frequency-domain sequence and different time-domain sequences. For example, at a given time the base station may schedule subscriber 1 and subscriber 2 both required to transmit 2 bits of ACK signal to transmit the ACK signal simultaneously, and assign the time-domain sequence (1,1,1,1) to subscriber 1 with the two bits of ACK signal of subscriber 1 occupying the sub vectors (1,1) and (1,1) respectively and assign the time-domain sequence (1,−1,1,−1) to subscriber 2 with the two bits of ACK signal of subscriber 2 occupying the sub vectors (1,−1) and (1,−1) respectively. In this case, it can also be ensured that the sequences of subscriber 1 and subscriber 2 are orthogonal to each other. The sequence assignment for subscriber 1 and subscriber 2 may also be made with reference to table 4.

For the 4×4 Hadamard matrix, to ensure the orthogonality while using the method proposed in the present invention, the following two cases need to be considered in time-domain sequence and frequency-domain sequence assignment: a mobile station to transmit 2 bits of ACK signal and one or two mobile stations to transmit 1 bit of ACK signal are assigned to occupy the same frequency-domain sequence and different time-domain sequences in accordance with the correspondence relationship as shown in table 4; and a mobile station to transmit 2 bits of ACK signal and another mobile station to transmit 2 bits of ACK signal are assigned to occupy the same frequency-domain sequence and different time-domain sequences in accordance with the correspondence relationship as shown in table 4.

According to the above sequence assignment rules, a sequence assignment in practice is described hereafter by way of example. As shown in table 5, it illustrates a list of mobile stations required to transmit ACK signal currently. In table 5, the first row of mobile stations 2, 3, 5, 6, . . . , 18 are required to transmit 1 bit of ACK signal, and the second row of mobile stations 1, 4, 7, . . . , 16 are required to transmit 2 bits of ACK signal.

TABLE 5

| the number of ACK bits of mobile station | | | | | | | | | | |
|---|---|---|---|---|---|---|---|---|---|---|
| Mobile station to transmit 1 bit of ACK signal | 2 | 3 | 5 | 6 | 8 | 9 | 11 | 12 | 14 | 17 | 18 |
| Mobile station to transmit 2 bits of ACK signal | 1 | 4 | 7 | 10 | 13 | 15 | 16 | | | | |

According to the transmission resource assignment solution proposed in the present invention, the time-domain sequence and frequency-domain sequence assignment for the case as shown in table 5 is illustrated as in table 6. In table 6, mobile stations 1, 2 and 3 occupy the same frequency-domain sequence 1 and different time-domain sequences with the indexes of 1, 2 and 4 respectively, that is, corresponding to the first row of correspondence relationship in table 3. Mobile stations 5, 4 and 6 occupy the same frequency-domain sequence and different time-domain sequences with the indexes of 1, 2 and 3 respectively, that is, corresponding to the second row of correspondence relationship in table 3. The assignment of other sequences may also be made according to table 6 and thus is not described herein in detail.

TABLE 6

| ACK sequence assignment | | | | |
|---|---|---|---|---|
| Data Frequency-domain sequence | Time-domain sequence | | | |
| | 1 | 2 | 3 | 4 |
| 1 | 1 | 2 | | 3 |
| 2 | | | | |
| 3 | 5 | 4 | 6 | |
| 4 | | | | |
| 5 | | 8 | 7 | 9 |
| 6 | | | | |
| 7 | 11 | | 12 | 10 |
| 8 | | | | |
| 9 | 13 | | 15 | |
| 10 | | | | |
| 11 | 16 | 17 | | 18 |
| 12 | | | | |

In addition, when a certain mobile station in the system is required to feed back more bits of ACK signal simultaneously, the proposed method may be used in combination with other methods. For example, to feed back four bits of ACK signal, each two bits of the four bits are modulated into a QPSK symbol, and then assigned with a time-domain sequence and a frequency-domain sequence according to the above method. In addition, each two bits of the four bits may also be combined into one bit and then assigned with a time-domain sequence and a frequency-domain sequence according to the above method. In addition to these two methods, other similar methods can also be used and are not be described here in detail.

Figure 8:
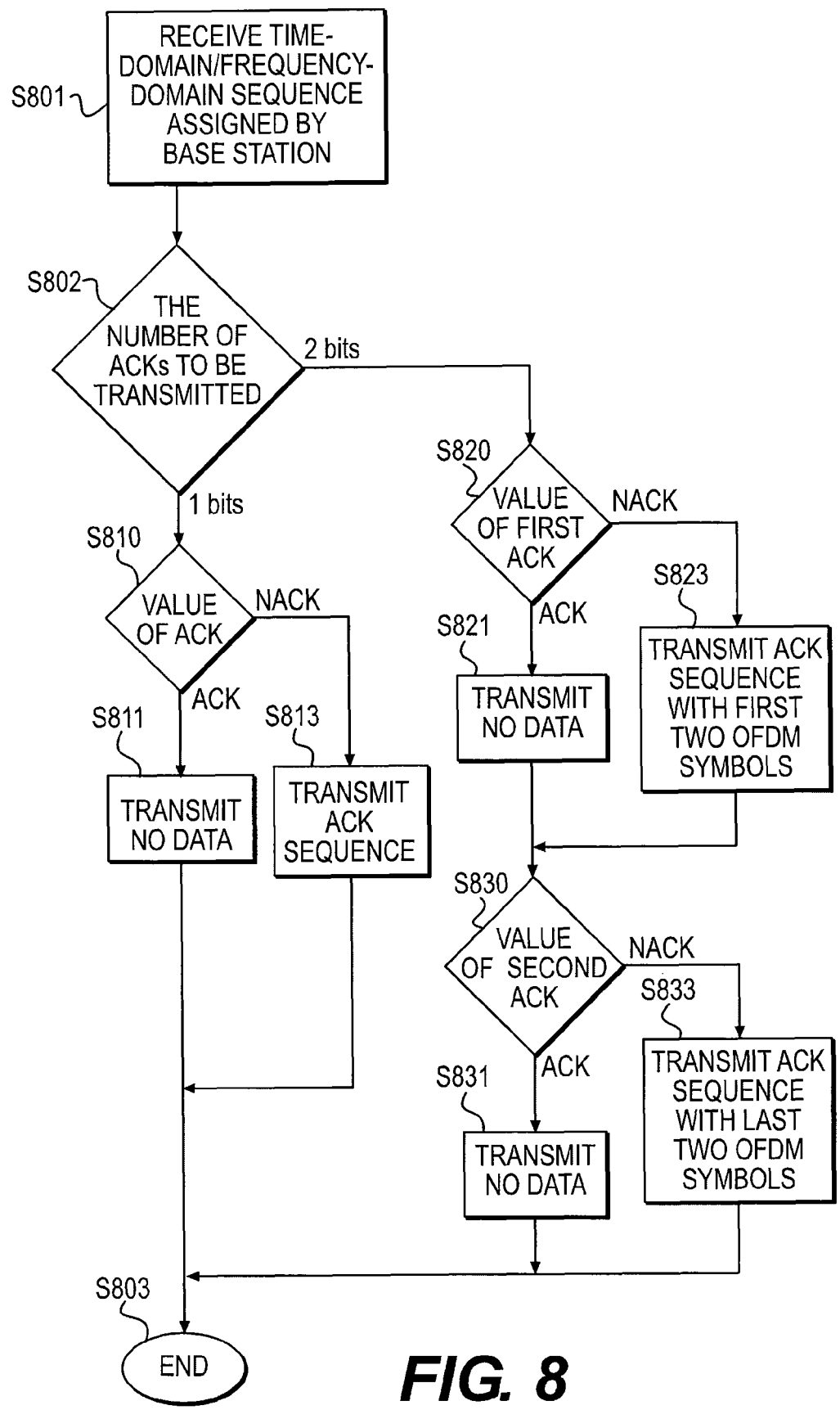
FIG. 8 illustrates a flow chart for an ACK signal transmitting process according to an embodiment of the present invention.

FIG. 8 specifically illustrates a processing flow of transmitting two bits of ACK signal according to the above method. As shown in FIG. 8, the time-domain sequence and the frequency-domain sequence assigned by the base station for ACK signal transmission are received at step S801, and then the number of the ACK signal required to be transmitted is determined at step S802.

If it is determined at step S802 that it is required to transmit 1 bit of ACK signal, the processing process proceeds to step S810 to determine the value of the ACK signal to be transmitted. If the value of the ACK signal is ACK, no data is transmitted at step S811 and the process proceeds directly to step S803 to be terminated. If it is determined at step S810 that the value of the ACK signal required to be transmitted is NACK, the ACK signal is transmitted at step S813 according to the above described solution by using the time-domain sequence and the frequency-domain sequence assigned by the base station, and then the processing process proceeds to step S803 to be terminated.

If it is determined at step S802 that it is required to transmit 2 bits of ACK signal, the processing process proceeds to step S820 to determine the value of the first ACK signal. If the value of the first ACK signal is ACK, no data is transmitted at step S821 and the process proceeds directly to step S830. If it is determined at step S820 that the value of the first ACK signal required to be transmitted is NACK, the ACK sequence is transmitted at step S823 by using the first two OFDM symbols for transmitting the ACK signal, and then the processing process proceeds to step S830.

At step S830, the value of the second ACK signal is determined. If the value of the second ACK signal is ACK, no data is transmitted at step S831 and the process proceeds directly to step S803 to be terminated. If it is determined at step S830 that the value of the second ACK signal required to be transmitted is NACK, the corresponding ACK sequence is transmitted at step S833 by using the last two OFDM symbols for transmitting the ACK signal, and then the processing process proceeds to step S803 to be terminated.

Figure 9:
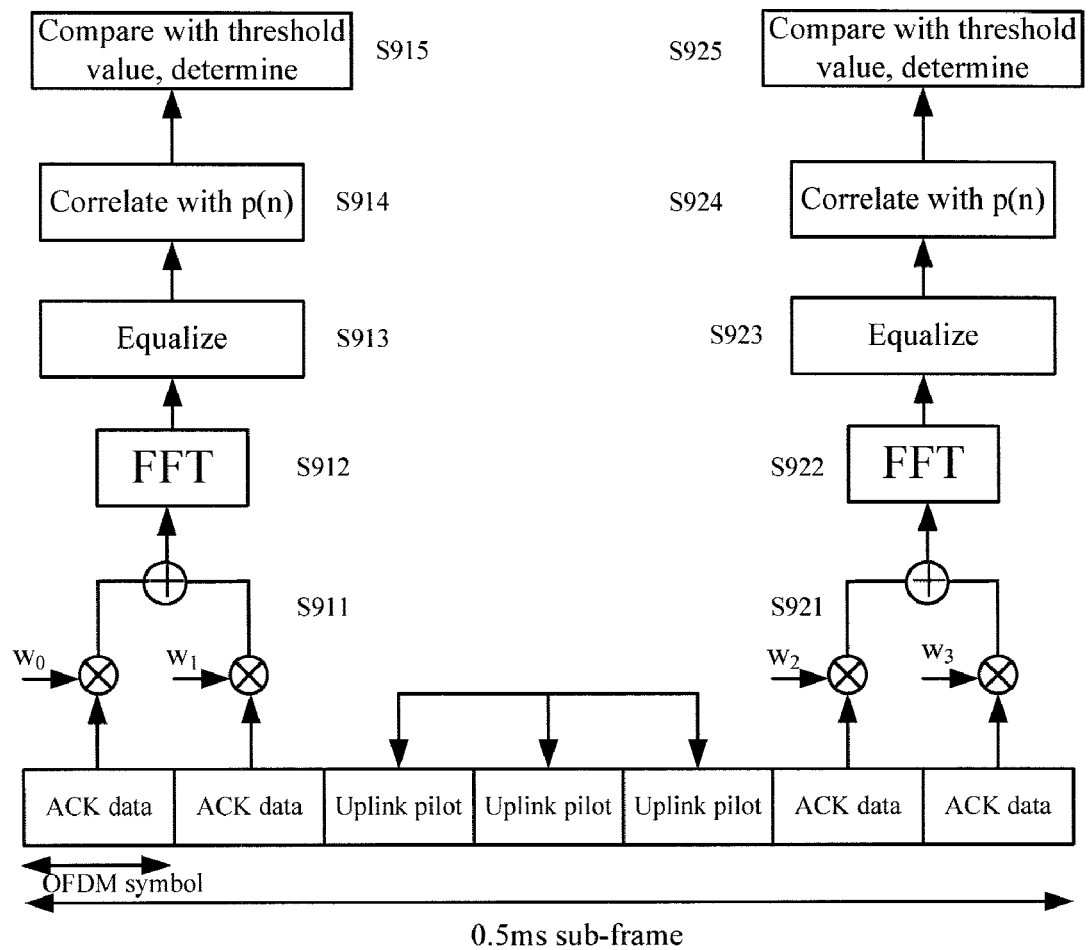
FIG. 9 illustrates a flow chart of a receiving process for a base station with respect to 2 bits of ACK signal according to an embodiment of the present invention.

Accordingly, for a subscriber transmitting two bits of ACK signal according to the method as shown in FIG. 8, the base station may use the receiving method as shown in FIG. 9 to receive the ACK signal. FIG. 9 illustrates a flow chart of a receiving process for a base station with respect to a mobile station transmitting 2 bits of ACK signal according to an embodiment of the present invention.

As shown in FIG. 9, the received four OFDM symbols are divided into two parts and are separately received and determined to determine whether the response signal transmitted by the mobile station are ACK signal or NACK signal. In addition that two OFDM symbols are processed respectively at steps S911 and S921, which is different from that four OFDM symbols are processed at step S41 of FIG. 4, the remaining steps S912 to S915 and steps S922 and S925 are similar with steps S42 to S45 respectively and thus the detail description thereof is omitted for the purpose of conciseness.

Figure 4:
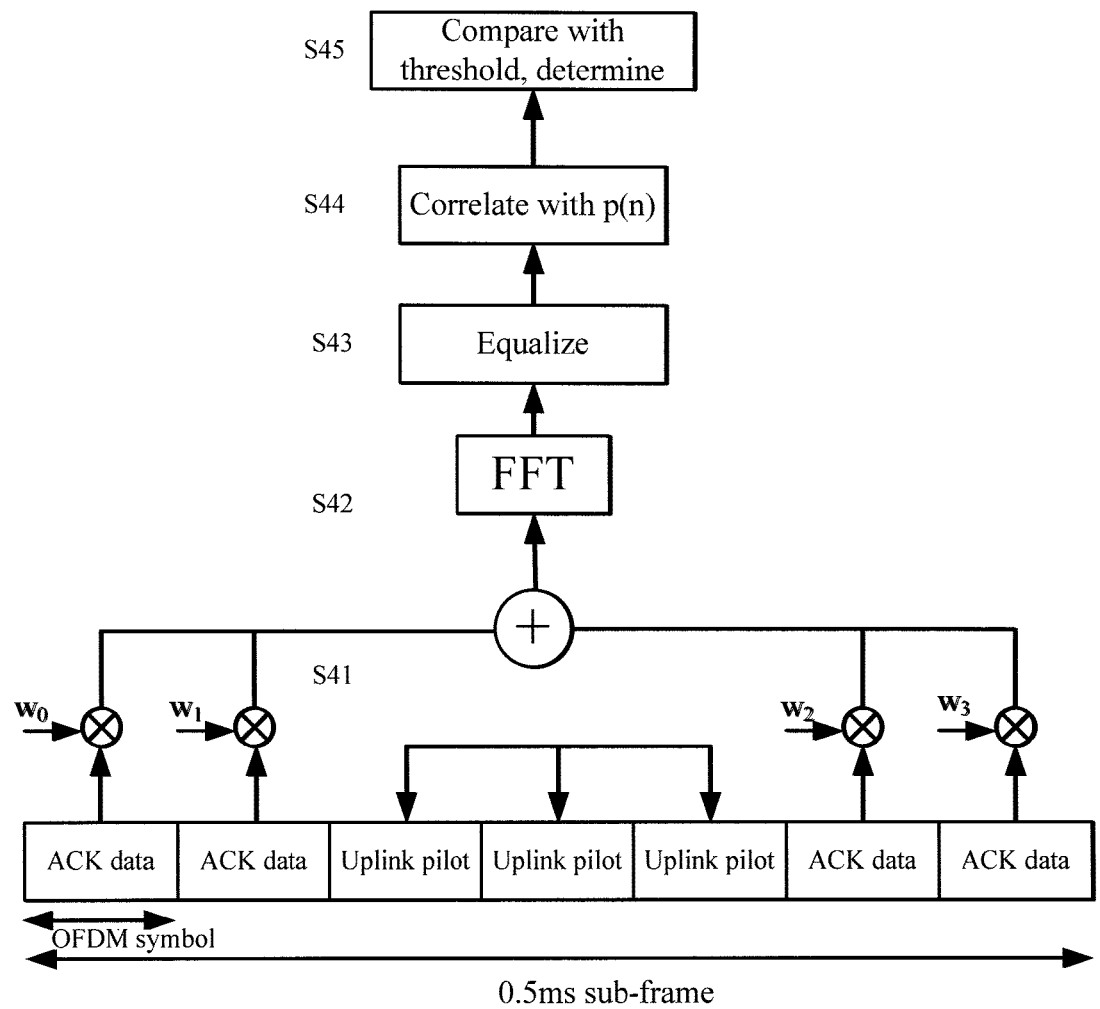
FIG. 4 is a flow chart illustrating an ACK signal receiving and processing process of a base station in the prior art.

It also should be noted that the threshold value in FIG. 9 is less than that defined in FIG. 4 for receiving single bit of ACK signal.

In addition, corresponding to the above transmission resource assignment method for response signals, the present invention may also be implemented as a transmission resource assignment apparatus for response signals. The apparatus includes: a component configured to determine a list of mobile stations required to transmit response signals currently; a component configured to determine the number of the response signals required to be transmitted by each mobile station; and a component configured to assign a frequency-domain sequence and a time-domain sequence for each mobile station to transmit the response signals. For multiple mobile stations assigned with the same frequency-domain sequence, the time-domain sequence assigned to the mobile station required to transmit multiple response signal groups is divided into multiple subsequences to be used to transmit the multiple response signal groups of the mobile station respectively, and parts of the time-domain sequences of different mobile stations corresponding to the multiple subsequences are orthogonal to each other respectively.

The response signals each represent a failed decoding of a data package or a successful decoding of the data package.

In addition, corresponding to the above feedback method of response signals, the present invention may also be implemented as a feed back apparatus of response signals. The apparatus includes: a component configured to determine a frequency-domain sequence and a time-domain sequence for transmitting a response signal; a component configured to determine a sub sequence of the time-domain sequence permitted to be used to transmit the response signal; and a component configured to transmit the response signal by using the determined sub sequence and the frequency-domain sequence for transmitting the response signal.

Similarly, corresponding to the above processing method of response signals, the present invention may also be implemented as a processing apparatus of response signals. The apparatus includes: a component configured to determine the number of the response signals; a component configured to correlate the OFDM symbols corresponding to each response signal with a corresponding time-domain sequence; a component configured to correlate the sequence obtained after correlating with the corresponding time-domain sequence with a frequency-domain sequence corresponding to the response signal in frequency-domain; and a component configured to compare the correlation value obtained after correlating in the frequency-domain with a predefined threshold value to determine the contents of the response signal.

The frequency-domain sequence includes a CAZAC sequence with different cyclic time shifts, and the time-domain includes a Discrete Fourier Transform (DFT) sequence, a CAZAC sequence or a vector of a Hadamard matrix. The CAZAC sequence includes a ZC sequence or a GCL sequence.

The transmission resource assignment apparatus, feedback apparatus and processing apparatus for response signals according to the present invention may implement respective functions according to the above detailed description of the corresponding transmission resource assignment method, feedback method and processing method for response signals, so as to achieve the respective objects and technical effects of the present invention. For the purpose of conciseness, these will not be described herein in detail.

Though the principle of the present invention has been described above in conjunction with the embodiments, it should be noted that it is conceivable for those ordinarily skilled in the art that all or any of the steps or components of the methods and apparatus of the present invention may be implemented with hardware, firmware, software or the combination thereof in any computing device (including a processor or a storage medium etc.) or a network of the computing device. These can be implemented by those ordinarily skilled in the art by reading the description of the present invention in conjunction with their programming skill, and thus the detailed description thereof is omitted here.

Therefore, based on the above understanding, the objects of the present invention may also achieved by running a program or a group of programs on any information processing device. The information processing device may be a well known general device. Accordingly, the objects of the present invention may also be achieved by only providing a program product containing program codes for implementing the methods or apparatuses of the present invention. That is, such a program product also forms the present invention, and a storage medium storing such a program product also forms the present invention. It is apparent that the storage medium may be any storage medium that is well known or to be developed. Accordingly it is not necessary to list various storage mediums herein.

In the apparatuses and methods or the present invention, it is apparent that the components and the steps may be decomposed and/or recombined. These decompositions and/or recombinations should be deemed as equivalent solutions of the present invention. Moreover, the steps performing the above series of processes may be performed naturally according to the described sequence or according to the order of time, but not necessarily to be performed according to the order of time. Some of the steps may be performed in parallel or separately from each other.

The preferred embodiments of the present invention have been described above. It should be understood by those ordinarily skilled in the art that the protection scopes of the present invention is not limited to the details discloses herein, and there may be various modifications and equivalents without departing from the spirit and scope of the present invention.

What is claimed is:

1. A transmission resource assigning method for response signals, comprising: determining a list of mobile stations required to transmit response signals currently; determining the number of the response signals required to be transmitted by each mobile station; and assigning a frequency-domain sequence and a time-domain sequence having a length of 4 bits for each mobile station to transmit the response signals; wherein for multiple mobile stations assigned with the same frequency-domain sequence, the time-domain sequence assigned to the mobile station required to transmit multiple response signal is divided into multiple subsequences having a length of 2 bits to be used to transmit the multiple response signal of the mobile station respectively; and the divided subsequences of the time-domain sequence assigned to different mobile stations are orthogonal to each other between the different mobile stations, and wherein in the case where the mobile stations assigned with the same frequency-domain sequence comprise a first mobile station comprising one response signal group including 2 bits of response signals and a second and a third mobile stations comprising 1 bit of response signal respectively, the time-domain sequence is from a Hadamard matrix.

2. The transmission resource assigning method for response signals according to claim 1, wherein the frequency-domain sequence comprises a Constant Amplitude Zero Auto Correlation (CAZAC) sequence with different cyclic time shifts.

3. The transmission resource assigning method for response signals according to claim 1, wherein the time-domain sequence comprises a Discrete Fourier Transform (DFT) sequence, a CAZAC sequence or a vector from a Hadamard matrix.

4. The transmission resource assigning method for response signals according to claim 1,
wherein the Hadamard matrix is a 4×4 Hadamard matrix $$\begin{vmatrix} 1 & 1 & 1 & 1 \\ 1 & -1 & 1 & -1 \\ 1 & 1 & -1 & -1 \\ 1 & -1 & -1 & 1 \end{vmatrix};$$

assigning any row vector of the Hadamard matrix to the first mobile station, the first half sub vector of the row vector being assigned to the first bit of response signal in the response signal group of the first mobile station, and the second half sub vector of the row vector being assigned to the second bit of response signal; assigning to the second mobile station a row vector of the Hadamard matrix which is different from the row vector assigned to the first mobile station, the first half and second half sub vectors of the row vector assigned to the second mobile station being orthogonal to the corresponding parts of the row vector assigned to the first mobile station respectively; and assigning to the third mobile station a row vector of the Hadamard matrix which is different from the row vectors assigned to the first and second mobile stations, the first half and second half sub vectors of the row vector assigned to the third mobile station being orthogonal to the corresponding parts of the row vector assigned to the first mobile station.

5. The transmission resource assigning method for response signals according to claim 1, wherein the Hadamard matrix is a 4×4 Hadamard matrix $$\begin{vmatrix} 1 & 1 & 1 & 1 \\ 1 & -1 & 1 & -1 \\ 1 & 1 & -1 & -1 \\ 1 & -1 & -1 & 1 \end{vmatrix};$$

assigning any row vector of the Hadamard matrix to the first mobile station, the first half sub vector of the row vector being assigned to the first bit of response signal in the response signal group of the first mobile station, the second half sub vector of the row vector being assigned to the second bit of response signal; and assigning to the second mobile station an another row vector of the Hadamard matrix which is different from the row vector assigned to the first mobile station, the first half sub vector of the another row vector being assigned to the first bit of response signal in the response signal group of the second mobile station, the second half sub vector of the another row vector being assigned to the second bit of response signal, and the first half and second half sub vectors of the another row vector being orthogonal to the corresponding parts of the row vector assigned to the first mobile station.

6. The transmission resource assigning method for response signals according to claim 1, further comprising:
performing modulation on response signals of the response signal group containing more than one response signal; and
mapping the modulated signal to the corresponding frequency-domain sequence and time-domain sequence.

7. The transmission resource assigning method for response signals according to claim 1, wherein the response signal is a signal representing a successful decoding of a data package or a signal representing a failed decoding of the data package.

8. The transmission resource assigning method for response signals according to claim 7, wherein when a mobile station with one response signal group transmits the response signals by means of ON-OFF keying, if any bit of response signal in the response signal group represents a successful decoding of a data package, no data will be transmitted in the corresponding two OFDM symbols for transmitting the any bit of response signal; if any bit of response signal in the response signal group represents a failed decoding of the data package, data will be transmitted in the two OFDM symbols for transmitting the any bit of response signal according to the assigned frequency-domain sequence and sub vector of the time-domain sequence.

9. The transmission resource assigning method for response signals according to claim 8, wherein when assigning sequences for all mobile stations required to transmit the response signals, the time-domain sequences are evenly assigned to each mobile station, and each time-domain sequence is assigned substantially for the same times.

10. A feedback method of response signals, comprising: determining a frequency-domain sequence and a time-domain sequence for transmitting a response signal; determining a sub sequence permitted to be used to transmit the response signal in the time-domain sequence; and transmitting the response signal by using the determined sub sequence and the frequency-domain sequence for transmitting the response signal, and wherein in the case where mobile stations assigned with a same frequency-domain sequence comprise a first mobile station comprising one response signal group including 2 bits of response signals and a second and a third mobile stations comprising 1 bit of response signal respectively, the time-domain sequence is from a Hadamard matrix.

11. The feedback method of response signals according to claim 10, further comprising determining a signal representing a failed decoding of a data package; and
wherein in the transmitting the response signal, the determined sub sequence and the frequency-domain sequence for transmitting the response signal is used to only transmit the signal representing the failed decoding of the data package.

12. The feedback method of response signals according to claim 11, further comprising:
   grouping the response signals into multiple response signal groups, the number of the response signal groups is equal to the number of the sub sequences of the time-domain sequence permitted to be used to transmit the response signals; and
   wherein in the transmitting the response signal, the multiple response signal groups are transmitted by using different sub sequences and frequency-domain sequences.

13. The feedback method of response signals according to claim 12, further comprising:
   performing modulation on the response signals of the response signal group containing more than one response signal; and
   mapping the modulated signal to the corresponding frequency-domain sequence and time-domain sequence.

14. The feedback method of response signals according to claim 10, wherein the frequency-domain sequence comprises a Constant Amplitude Zero Auto Correlation (CAZAC) sequence with different cyclic time shifts.

15. The feedback method of response signals according to claim 10, wherein the time-domain sequence comprises a Discrete Fourier Transform (DFT) sequence, a CAZAC sequence or a vector from a Hadamard matrix.

16. The feedback method of response signals according to claim 10, wherein when a mobile station with one response signal group transmits the response signals by means of ON-OFF keying, if any bit of response signal in the response signal group represents a successful decoding of a data package, no data will be transmitted in the corresponding two OFDM symbols for transmitting the any bit of response signal; if any bit of response signal in the response signal group represents a failed decoding of the data package, data will be transmitted in the two OFDM symbols for transmitting the any bit of response signal according to the assigned frequency-domain sequence and sub vector of the time-domain sequence.

* * * * *